United States Patent
Haynes (10) Patent No.: US 6,469,653 B1
(45) Date of Patent: Oct. 22, 2002

(54) APPARATUS AND METHOD FOR SELECTIVELY MONITORING RADAR SIGNALS AND PROVIDING AN ALERT RESPONSIVE THERETO

(75) Inventor: James Rountree Haynes, Lake City, SC (US)

(73) Assignee: Uniden America Corporation, Ft. Worth, TX (US)

( * ) Notice: Subject to any disclaimer, the term of this patent is extended or adjusted under 35 U.S.C. 154(b) by 0 days.

(21) Appl. No.: 09/935,073

(22) Filed: Aug. 22, 2001

(51) Int. Cl.[7] .............. H04K 3/00; G08G 1/00; G08G 1/01; G01S 13/00
(52) U.S. Cl. ............ 342/20; 342/27; 340/904; 340/936
(58) Field of Search ............ 342/20, 27, 73, 342/104, 105; 340/904, 936; 180/170, 171

(56) References Cited

U.S. PATENT DOCUMENTS

| | | | |
|---|---|---|---|
| 3,660,844 A | 5/1972 | Potter | 343/18 E |
| 3,922,660 A | * 11/1975 | Galvin | 340/258 |
| 4,028,662 A | 6/1977 | Young | 340/32 |
| 4,313,216 A | 1/1982 | Jaeger et al. | 455/226 |
| 4,315,261 A | 2/1982 | Mosher | 343/18 E |
| 4,350,970 A | 9/1982 | von Tomkewitsch | 340/23 |
| 4,750,215 A | 6/1988 | Biggs | 455/226 |
| 4,791,420 A | 12/1988 | Baba | 342/20 |
| 4,949,088 A | 8/1990 | Ryan et al. | 342/20 |
| 5,068,663 A | 11/1991 | Valentine et al. | 342/20 |
| 5,146,227 A | 9/1992 | Papadopoulos | 342/20 |
| 5,210,540 A | 5/1993 | Masumoto | 342/357 |
| 5,223,844 A | 6/1993 | Mansell et al. | 342/357 |
| 5,250,951 A | 10/1993 | Valentine et al. | 342/20 |
| 5,276,451 A | 1/1994 | Odagawa | 342/357 |
| 5,363,071 A | 11/1994 | Schwent et al. | 333/111 |
| 5,459,677 A | 10/1995 | Kowalski et al. | 364/571.02 |
| 5,463,554 A | 10/1995 | Araki et al. | 364/444 |
| 5,504,482 A | 4/1996 | Schreder | 340/995 |
| 5,510,793 A | * 4/1996 | Gregg, III et al. | 342/20 |
| 5,572,201 A | 11/1996 | Graham et al. | 340/902 |

(List continued on next page.)

FOREIGN PATENT DOCUMENTS

JP 7-351250 12/1995 ............ G08G/1/00

Primary Examiner—Thomas H. Tarcza
Assistant Examiner—Brian Andrea
(74) Attorney, Agent, or Firm—Danamraj & Youst, P.C.; Lawrence R. Youst (57) ABSTRACT

An apparatus (10) and method for selectively monitoring radar signals impinging on a vehicle is disclosed. The apparatus (10) comprises a speed determination circuit (20) that determines vehicle speed and provides a speed signal representative thereof to a comparator (22) that compares the speed signal to a preselected speed and provides an on signal when the vehicle speed exceeds the preselected speed and an off signal when the vehicle speed is at or below the preselected speed. When the comparator (22) provides the on signal, a radar detecting circuit (14) is powered to detect incoming radar signals and provide a radar detected signal to an alarm (18) that provides an alert in response to the radar detected signal. When the comparator (22) provides the off signal, the radar detecting circuit (14) is not powered and does not detect incoming radar signals.

32 Claims, 5 Drawing Sheets

U.S. PATENT DOCUMENTS

| | | | |
|---|---|---|---|
| 5,581,464 A | 12/1996 | Woll et al. | 364/424.04 |
| 5,619,211 A | 4/1997 | Horkin et al. | 342/357 |
| 5,659,290 A * | 8/1997 | Haeri | 340/441 |
| 5,668,739 A | 9/1997 | League et al. | 382/103 |
| 5,684,476 A | 11/1997 | Anderson | 340/988 |
| 5,699,056 A | 12/1997 | Yoshida | 340/905 |
| 5,714,948 A | 2/1998 | Farmakis et al. | 340/961 |
| 5,715,045 A * | 2/1998 | Dunne | 356/28 |
| 5,717,398 A * | 2/1998 | Pollin | 342/20 |
| 5,761,630 A | 6/1998 | Sekine et al. | 701/301 |
| 5,856,801 A | 1/1999 | Valentine et al. | 342/20 |
| 5,916,300 A | 6/1999 | Kirk et al. | 701/213 |
| 5,917,430 A | 6/1999 | Greneker, III et al. | 340/905 |
| 5,955,973 A | 9/1999 | Anderson | 340/988 |
| 5,977,884 A | 11/1999 | Ross | 340/936 |
| 5,983,158 A | 11/1999 | Suzuki et al. | 701/209 |
| 6,169,511 B1 | 1/2001 | Iwakuni et al. | 342/20 |
| 6,201,493 B1 | 3/2001 | Silverman | 342/20 |
| 6,204,798 B1 | 3/2001 | Fleming, III | 342/20 |
| 6,252,544 B1 | 6/2001 | Hoffberg | 342/357.1 |
| 6,265,989 B1 | 7/2001 | Taylor | 340/901 |
| 6,384,776 B1 * | 5/2002 | Martin | 342/357.09 |

* cited by examiner

APPARATUS AND METHOD FOR SELECTIVELY MONITORING RADAR SIGNALS AND PROVIDING AN ALERT RESPONSIVE THERETO

TECHNICAL FIELD OF THE INVENTION

This invention relates, in generally, to an apparatus for selectively monitoring radar signals impinging on a moving vehicle and providing an alert responsive thereto and, in particular, to an apparatus for selectively monitoring radar signals only when the vehicle is traveling above a preselected speed.

BACKGROUND OF THE INVENTION

Without limiting the scope of the present invention, its background will be described with reference to radar detectors used to alert drivers to the use of speed-determining radar devices as an example.

Law enforcement officials commonly use speed-determining radar devices to monitor the speed of motor vehicles traveling on roads and highways. The speed-determining radar devices emit electromagnetic radiation in specific bands of the radio-frequency spectrum. Specifically, speed-determining radar devices typically emit electromagnetic radiation in the X band (10.50 Ghz to 10.55 Ghz), the Ku band (13.40 Ghz to 13.50 Ghz), the K band (24.05 Ghz to 24.25 Ghz) and the Ka band (33.40 Ghz to 36.00 Ghz).

Accordingly, radar detectors used to alert drivers to the use of speed-determining radar devices must be able to sweep the entire radio-frequency spectrum of interest and issue an alert upon detection of a radar signal within one of the specific bands. Since the frequencies emitted by the speed-determining radar devices are high, typical radar detectors use a superheterodyne radio receiver that mixes the received radio-frequency signal with a local oscillator signal. The heterodyning of these signals produces two intermediate frequency signals whose frequencies are the sum and difference of the radio-frequency signal frequency and the local oscillator signal frequency. Since the difference intermediate frequency is typically desired, the difference frequency is separated from the sum frequency using a filter. Thereafter, the filtered intermediate frequency signal may be amplified and used to alert the driver, via audible signals, visual signals and the like to the use of a speed-determining radar device.

It has been found, however, that the use of such superheterodyne radio receivers to mix radio-frequency signals with a local oscillator signal may result in spurious emission of portions of the local oscillator signal from the radar detector. These spurious emissions have been linked to interference in the spectral proximity of the local oscillator signal. For example, it has been suggested that these spurious emissions interfere with communication between satellites and earth-based satellite transceivers. Interesting, this interference has been particularly noted near intersections when vehicles having radar detectors are traveling at low speeds or are at rest.

In some prior radar detectors used to alert drivers to the use of speed-determining radar devices, anti-false alarm systems have been implemented. Specifically, U.S. Pat. No. 5,977,884 issued Nov. 2, 1999 to Ross discloses a radar detecting circuit adapted to be on a vehicle to detect a radar signal and selectively provide a radar detect signal in response to detecting the radar signal. In the Ross system, the vehicle's speed is determined by a tachometer signal or a global positioning system receiver adapted to be on the vehicle which provides a speed signal representative of the vehicle speed. An alarm responsive to both the radar detect signal and the speed signal provides an alarm indication when a radar signal is detected and the vehicle speed is above a preset maximum, such as the speed limit. The operator of the Ross detector may set the present maximum speed via an input device such as a keypad or via voice recognition software.

Similarly, U.S. Pat. No. 6,204,798 issued Mar. 20, 2001 to Fleming, III discloses a radar detector for alerting an operator of a motor vehicle to an incoming police radar signal. In the Fleming system, the radar detector includes a microprocessor, a circuit coupled to the microprocessor for detecting the incoming police radar signal and a global positioning system receiver coupled to the microprocessor. Upon detection of an incoming radar signal, the radar detector can utilize the position, velocity and/or heading data from the global positioning system receiver to determine whether to generate an alert.

While both of these designs minimize unnecessary alerts if the vehicle is traveling below a specified speed, neither of these systems addresses the problem of spurious emissions from radar detectors positioned in vehicles traveling at low speed or at rest. In both systems, the incoming radar signals are constantly monitored and processed regardless of the speed at which the vehicle is traveling. According, radar detectors made from these designs may contribute to interference in the spectral proximity of their local oscillator signals even when the vehicles are traveling at low speed or are at rest.

Therefore, a need has arisen for a radar detector that alerts drivers to the use of speed-determining radar devices and has a reduced likelihood of causing interference in the spectral proximity of the local oscillator signal. A need has also arisen for such a radar detector that selectively monitors radar signals such that spurious emissions of the local oscillator signal are selectively prevented when a vehicle having such a radar detector is traveling at a low speed or is at rest.

SUMMARY OF THE INVENTION

The present invention disclosed herein comprises an apparatus and method for alerting a driver to the use of speed-determining radar devices that reduces likelihood of interference in the spectral proximity of the local oscillator signal. The apparatus and method of the present invention achieve this result by selectively monitoring radar signals from speed-determining radar devices only when the vehicle is traveling above a preselected speed. Accordingly, spurious emissions of the local oscillator signal are selectively prevented when a vehicle having an apparatus of the present invention operating therein is traveling at a speed below the preselected speed.

The apparatus for selectively monitoring radar signals of the present invention comprises a speed determination circuit that determines the speed of the vehicle and provides a speed signal representative thereof to a comparator. The speed determination circuit may be, for example, a global positioning system receiver or a circuit processing a speed signal sent from the vehicle. In either case, the comparator compares the speed signal to a preselected speed and provides an on signal when the vehicle speed exceeds the preselected speed and an off signal when the vehicle is at or below the preselected speed. The preselected speed may be zero or may be a speed greater than zero.

The signal generated the comparator, either the on signal or the off signal, is then sent to a radar detecting circuit. When the radar detecting circuit received the on signal, the radar detecting circuit is powered such that it may detect radar signals originating from a radar source remote from the vehicle. When such radar signals are detected, the radar detecting circuit processes the radar signals by, among other things, mixing the radar signals with a local oscillator signal. After processing the radar signals, the radar detecting circuit generates a radar detected signal, which is provided to an alarm. The alarm, in response to the radar detected signal, provides an alert to the driver of the vehicle of the use of a speed-determining radar device. Alternatively, if the radar detecting circuit received the off signal from the comparator, the radar detecting circuit is not powered. Accordingly, no spurious emission from the radar detecting circuit occurs.

Broadly stated, the method of the present invention involves determining the vehicle speed, determining whether the vehicle speed exceeds a preselected speed and detecting the radar signals only if the vehicle speed exceeds the preselected speed. More specifically, the method of the present invention involves determining the vehicle speed and generating a speed signal representative thereof, comparing the speed signal with a preselected speed, generating an on signal if the vehicle speed exceeds the preselected speed and generating an off signal if the vehicle speed is at or below the preselected speed, receiving the radar signals with an antenna, generating a local oscillator signal that is mixed with the radar signals to generate a radar detected signal, if the on signal is generated and providing an alert if the radar detected signal is generated.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
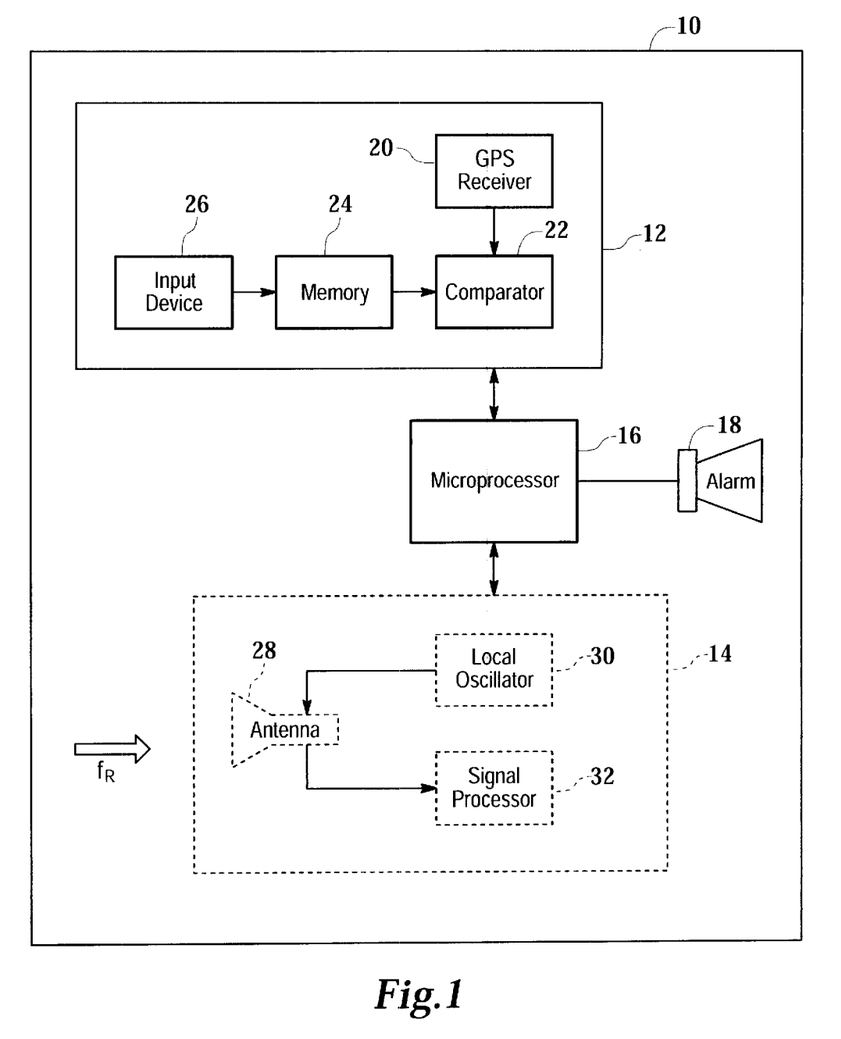
FIG. 1 is a block diagram an apparatus for selectively monitoring radar signals of the present invention depicting a radar detecting circuit that is not powered.
Figure 2:
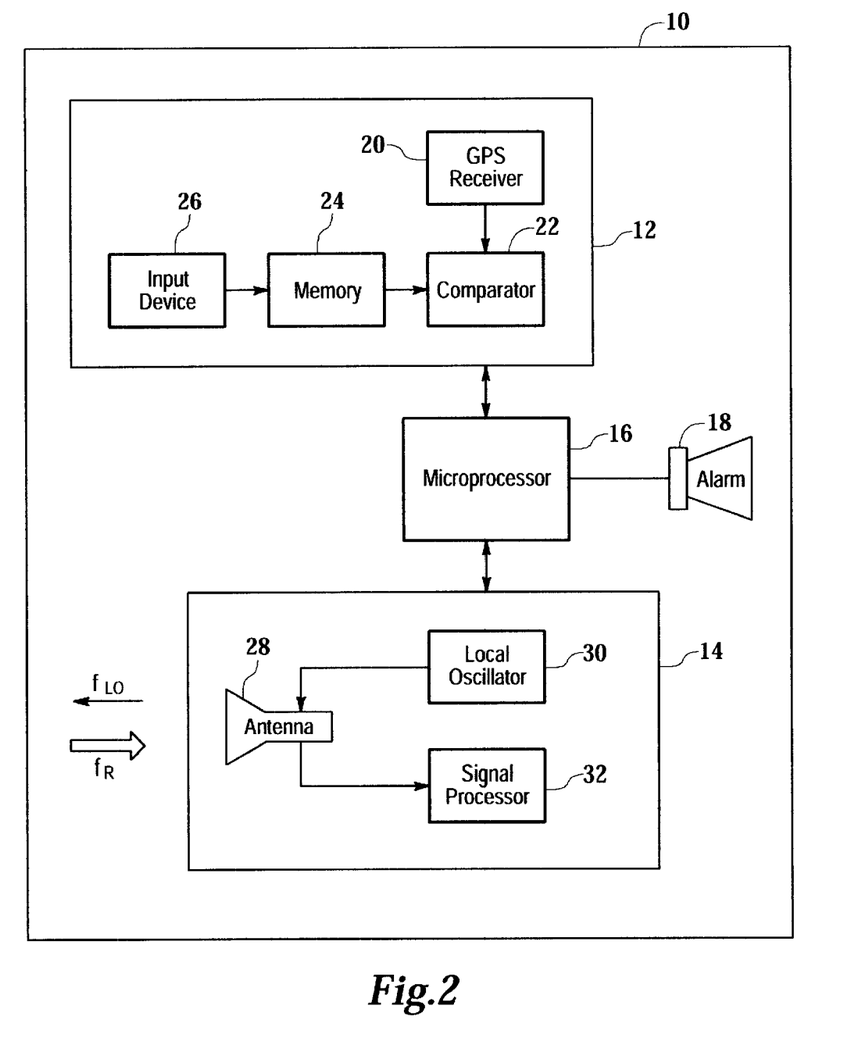
FIG. 2 is a block diagram an apparatus for selectively monitoring radar signals of the present invention depicting a radar detecting circuit that is powered.

Referring now to FIGS. 1 and 2, therein is depicted one embodiment of a radar detector for selectively monitoring radar signals of the present invention that is generally designated 10. Radar detector 10 includes a driver signal generator circuit 12, a radar detecting circuit 14, a microprocessor 16 and an alarm 18. More specifically, driver signal generator circuit 12 includes a speed determination circuit 20, a comparator 22, a memory 24 and an input device 26.

In the illustrated embodiment, speed determination circuit 20 is a global positioning system receiver that receives transmissions from, for example, satellites in a global positioning system. The satellite positions are used by speed determination circuit 20 as precise reference points to determine the location of radar detector 10. When receiving the signals from at least four satellites, the position of radar detector 10 can be determined based upon latitude, longitude, altitude and time. By identifying the position of radar detector 10 at two different times, the speed and heading of radar detector 10 can be determined with conventional algorithms. Accordingly, as radar detector 10 moves, the information obtained by speed determination circuit 20 may be used to calculate the vehicle speed. Using this information, speed determination circuit 20 generates a speed signal representing the vehicle speed. This speed signal is then provided to comparator 22.

Comparator 22 compares the vehicle speed from the speed signal to a preselected speed obtained from memory 24. The preselected speed may be a factory default or may be input by the user via input device 26. For example, input device 26 may be a button, a wheel, a keypad, a mouse, a track ball or other suitable device which allows the user of radar detector 10 to input the preselected speed. The preselected speed may be zero or may be a speed greater than zero. As will become apparent to those skilled in the art, the preselected speed should not be set too high as it is intended that radar detector 10 will not monitor radar signals if the vehicle speed does not exceed the preselected speed.

For example, it is preferable to have the preselected speed below the speed limit of the road on which the vehicle is being operated. It is contemplated, however, that the user of radar detector 10 could choose a preselected speed that is greater than or less than the speed limit. In addition, it is contemplated that radar detector 10 could have a plurality of preselected speeds stored in memory 24. In this case, different preselected speeds may be associated with different geographical locates such that when radar detector 10 is in one geographic location, determined by the global positioning system receiver 20, one preselected speed is sent to comparator 22 but when radar detector 10 is in a different geographic location, a different preselected speed is sent to comparator 22.

Comparator 22 is used to determine whether the actual speed of the vehicle exceeds the preselected speed or whether the actual speed of the vehicle is at or below the preselected speed. If the actual speed of the vehicle is at or below the preselected speed, then a low logic signal or "off signal" is generated by driver signal generator circuit 12. In this case, radar detecting circuit 14 is not powered, as best seen in FIG. 1 and as indicated by the ghost images of radar detecting circuit 14 and its component parts. If the actual speed of the vehicle exceeds the preselected speed, however, then a high logic signal or "on signal" is generated by driver signal generator circuit 12. In this case, radar detecting circuit 14 is powered, as best seen in FIG. 2 and as indicated by the solid lines representing radar detecting circuit 14 and its component parts.

As noted above, the use of certain radar detectors having superheterodyne radio receivers that mix incoming radio-frequency signals with a signal generated by a local oscillator signal may emit spurious emissions. These spurious emissions have been linked to interference in the spectral proximity of the local oscillator signal during operation of such radar detectors. While such interference could be caused even when a vehicle having such a radar detector is traveling at a relatively high rate of speed, it has been found that such interference is particularly noted near intersections when vehicles are traveling at low speed or are at rest. As shown in FIG. 1, however, radar detector 10 of the present invention does not emit such spurious emissions at speeds that are at or below the preselected speed as radar detecting circuit 14 is not powered.

When the actual speed of the vehicle exceeds the preselected speed and driver signal generator circuit 12 delivers the on signal, radar detecting circuit 14 is powered. In this case and as seen in FIG. 2, radar detecting circuit 14 receives the radar signals of the various bands of interest including, for example, the X band, the Ku band, the K band, the Ka band and laser bands, with antenna 28. These received radio-frequency signals, which are indicated by arrow $f_R$ is then mixed with a local oscillator signal generated by local oscillator 30, a portion of which may be emitted from radar detector 10 as spurious emissions indicated by arrow $f_{LO}$. As explained above, the heterodyning of these signals produces two intermediate frequency signals whose frequencies are the sum and difference of the radio-frequency signal frequency and the local oscillator signal frequency. Antenna 28 then passes the heterodyned signals to signal processor 32 wherein those signals may be conditioned, filtered, amplified, tested for proper threshold levels and otherwise processed in a manner known by those skilled in the art such that a radar detected signal may be generated. Examples of such signal processing are described in U.S. Pat. No. 4,791,420 and U.S. Pat. No. 6,169,511, which are incorporated by reference.

In the illustrated embodiment, microprocessor 16 is used to control driver signal generator circuit 12 and radar detecting circuit 14. Microprocessor 16 may be any conventional single or multiple chip microprocessor or digital signal processor and may include a program storage device such as a PROM, EPROM, EEPROM, ROM, SRAM or the like. Conventionally, the program storage device contains machine readable instructions that instruct microprocessor 16 to perform various functions. The program storage device may also contain machine readable instructions that command microprocessor 16 to determine whether to power or turn off radar detecting circuit 14 based upon receipt of the on signal or the off signal from driver signal generator circuit 12.

Microprocessor 16 is also coupled to alarm 18. Alarm 18 is used to alert the user of radar detector 10 regarding the use of speed-determining radar devices when the radar detected signal is generated by radar detecting circuit 14. Alarm 18 may include one or more alarm tones, one or more visual indicators and the like or combinations of the above.

In addition, microprocessor 16 may be coupled to a user interface circuit (not shown) which allows the user of radar detector 10 to operate a plurality of buttons such as a power button, a mute button, a city/highway button, a dim button, a set preselected speed device and the like.

Figure 3:
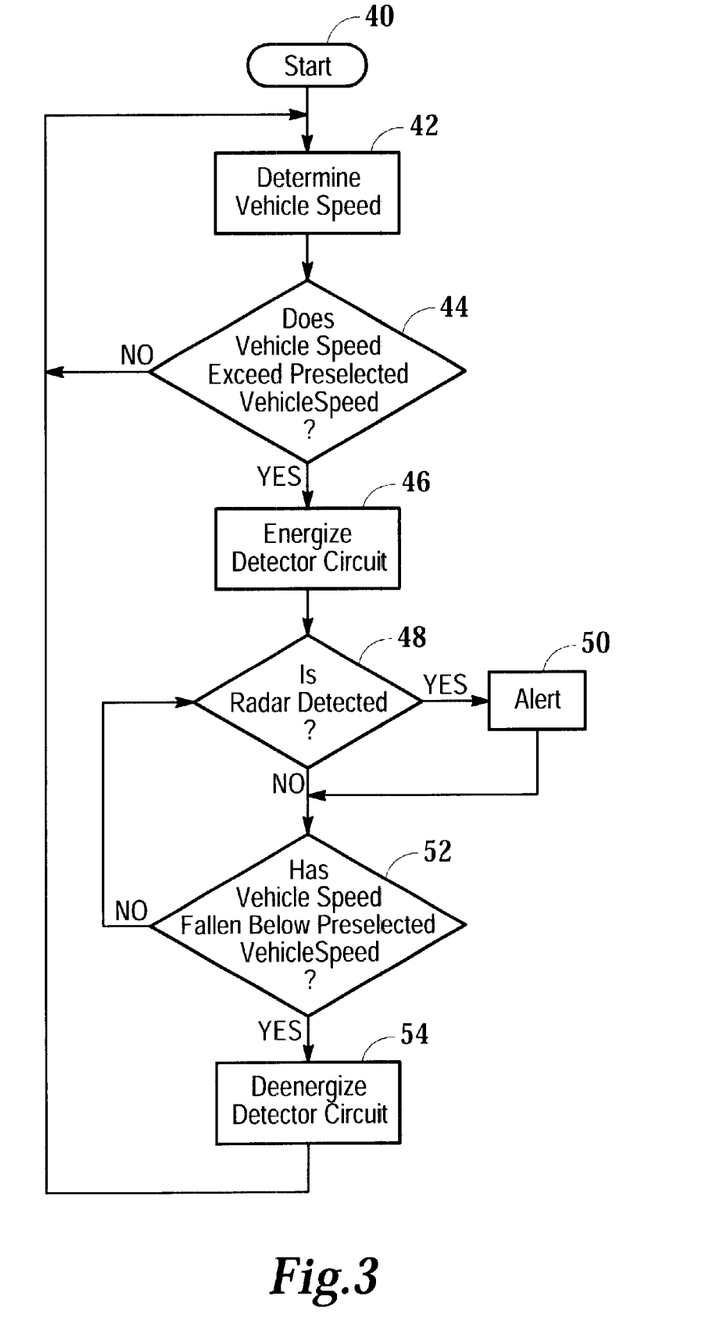
FIG. 3 is a flow chart illustrating the logical operation of an apparatus for selectively monitoring radar signals of the present invention.

Referring next to FIG. 3, therein is depicted a flow chart illustrating the logical operation of an apparatus for selectively monitoring radar signals of the present invention. The logic described in FIG. 3 may be implemented in hardware or software or a combination of both and will be described herein with reference to the embodiment described above in FIGS. 1 and 2. The operation of radar detector 10 begins at element 40 wherein radar detector 10 is turned on. Once activated, driver signal generator circuit 12 is used to determine the speed of the vehicle in which radar detector 10 is operating, in step 42. This is achieved, for example, using a global positioning system receiver for speed determination. Once the speed of the vehicle is determined, the logic progresses to decision 44 wherein it is determined whether the vehicle speed exceeds the preselected speed. If the vehicle speed does not exceed the preselected speed, then radar detector 10 continues to monitor the speed of the vehicle in step 42 without powering the radar detecting circuit 14.

Alternatively, if the vehicle speed does exceed the preselected speed, then the logic progresses to step 46 wherein radar detecting circuit 14 is powered. Once radar detecting circuit 14 is powered, radar detecting circuit 14 receives and processes any radar signals that impinge the vehicle. If no radar is detected, it is determined whether the vehicle has fallen below the preselected speed in decision 52. If the speed of the vehicle has fallen below the preselected speed, then the radar detecting circuit is turned off in step 54 and the logic proceeds back to step 42 such that a new determination of speed may take place and the new speed may be compared with the predetermined speed in decision 44. Conversely, if the speed of the vehicle has not fallen below the preselected speed in decision 52, the logic proceeds back to decision 48 such that the radar detecting circuit 14 may continue to attempt to detect the presence of radar signals.

When radar is detected in decision 48, a radar detected signal is sent to alarm 18 such that the driver of the vehicle receives an alert in step 50. Once the alert has been provided, the logic returns to decision 52 such that a determination of whether the vehicle has fallen below the preselected speed may be made. This process continues until radar detector 10 is turned off.

In summary, the apparatus of FIGS. 1 and 2 would operate according to the logic of FIG. 3 in the following manner. Driver signal generator circuit 12 and microprocessor 16 would always be operating when radar detector 10 is turned on. Global positioning system receiver 20 would continually provide speed signals to comparator 22 indicating the actual speed of the vehicle. Comparator 22 would compare this actual speed of the vehicle to the preselected speed. When the actual speed exceeds the preselected speed, an on signal would be provided by comparator 22 to power radar detecting circuit 14. Accordingly, radar detecting circuit 14 remains off and no local oscillator signals are generated unless the vehicle exceeds the preselected speed.

Once the vehicle speed has exceeded the preselected speed and as long as the vehicle speed remains above the preselected speed, radar detecting circuit 14 will be powered. In the powered state, if radar detecting circuit 14 detects radar impinging on the vehicle, the radar signals will be processed as described above and a radar detected signal will be generated and sent to alarm 18 such that an alert will be generated. If, however, the speed of the vehicle drops below the preselected speed, radar detecting circuit 14 will be turned off such that no local oscillator signals are generated, thereby prevent any spurious emissions.

Figure 4:
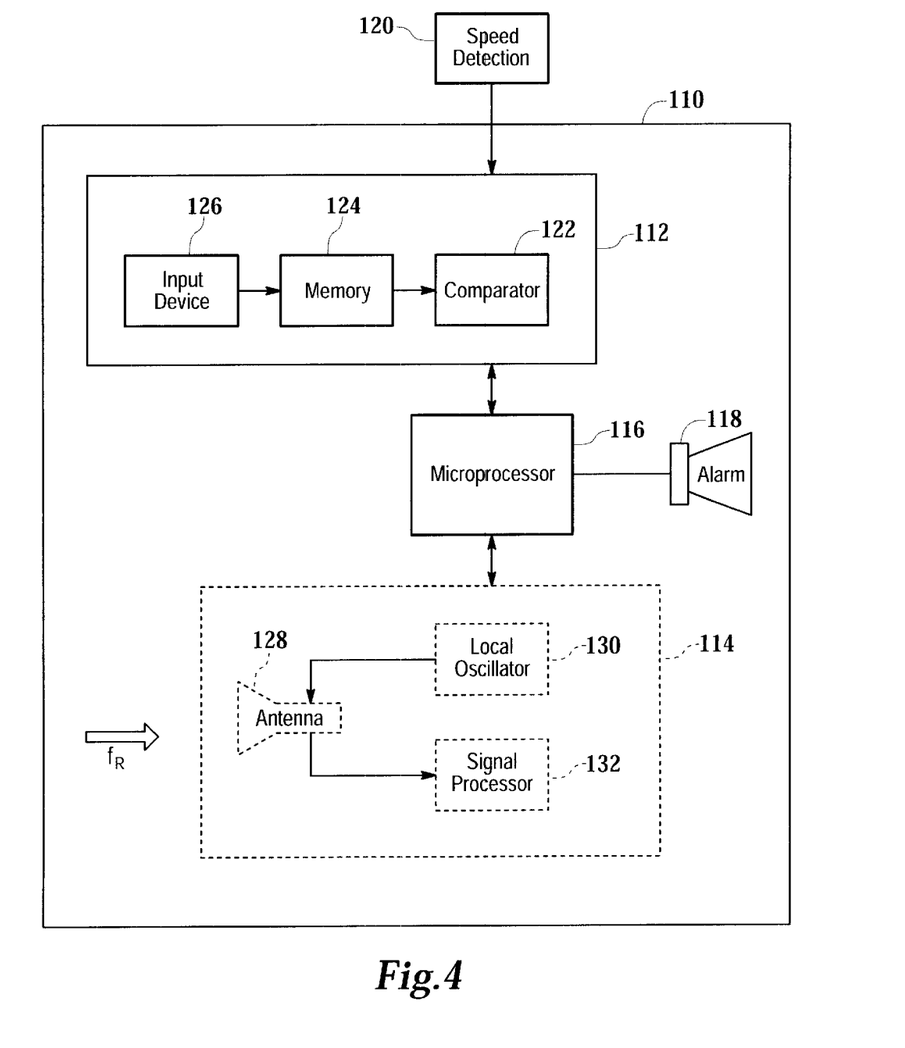
FIG. 4 is a block diagram an apparatus for selectively monitoring radar signals of the present invention depicting a radar detecting circuit that is not powered.
Figure 5:
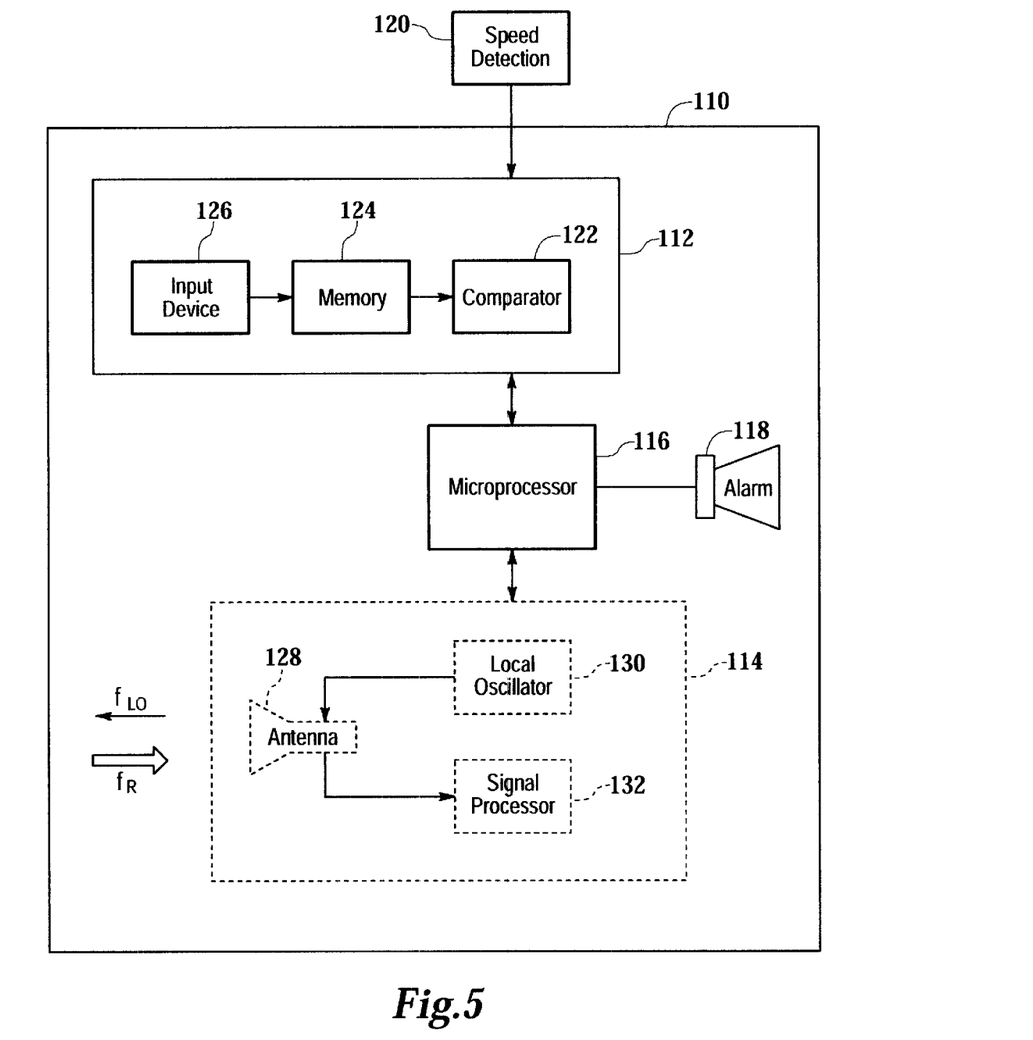
FIG. 5 is a block diagram an apparatus for selectively monitoring radar signals of the present invention depicting a radar detecting circuit that is powered.

Referring now to FIGS. 4 and 5, therein is depicted another embodiment of a radar detector for selectively monitoring radar signals of the present invention that is generally designated 110. Radar detector 110 includes a driver signal generator circuit 112, a radar detecting circuit 114, a microprocessor 116 and an alarm 118. More specifically, driver signal generator circuit 112 includes a comparator 122, a memory 124 and an input device 126. In the illustrated embodiment, a speed determination circuit 120 feeds driver signal generator circuit 112. Speed determination circuit 120 may be a global positioning system receiver associated with the vehicle or may be other types of speed determination devices associated with the vehicle such as a speedometer or the like. In any such embodiment, a speed signal representing the vehicle speed is generated by speed determination circuit 120 and is provided to comparator 122.

Comparator 122 compares the vehicle speed from the speed signal to a preselected speed obtained from memory 124. The preselected speed may be a factory default or may be input by the user via input device 126. If the actual speed of the vehicle is at or below the preselected speed, then a low logic signal or "off signal" is generated by driver signal generator circuit 112. In this case, radar detecting circuit 114 is not powered as best seen in FIG. 4 and as indicated by the ghost images of radar detecting circuit 114 and its component parts. If the actual speed of the vehicle exceeds the preselected speed, however, then a high logic signal or "on signal" is generated by driver signal generator circuit 112. In this case, radar detecting circuit 114 is powered, as best seen in FIG. 5 and as indicated by the solid lines representing radar detecting circuit 114 and its component parts.

When the actual speed of the vehicle exceeds the preselected speed and driver signal generator circuit 112 delivers the on signal, radar detecting circuit 114 is powered such that radar detecting circuit 114 may process any incoming radar signals of the various bands of interest received by antenna 128. This processing includes mixing the received radio-frequency signal with a local oscillator signal generated by local oscillator 130. Antenna 128 then passes the heterodyned signals to signal processor 132 wherein the signal may be further processed to generate a radar detected signal.

In the illustrated embodiment, microprocessor 116 is used to control driver signal generator circuit 112 and radar detecting circuit 114. In addition, microprocessor 116 also controls alarm 118 which is used to alert the user of radar detector 110 regarding the use of speed-determining radar devices when the radar detected signal is generated by radar detecting circuit 114.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. An apparatus for selectively monitoring radar signals impinging on a vehicle comprising:
   a speed determination circuit that determines a vehicle speed and provides a speed signal representative thereof;
   a comparator that receives the speed signal from the speed determination circuit, compares the speed signal to a preselected speed and provides an on signal when the vehicle speed exceeds the preselected speed and an off signal when the vehicle speed is at or below the preselected speed;
   a radar detecting circuit that detects the radar signals and provides a radar detected signal in response to detection of the radar signals when the comparator provides the on signal and does not detect the radar signals when the comparator provides the off signal; and
   an alarm responsive to the radar detected signal that provides an alert in response thereto.

2. The apparatus as recited in claim 1 wherein the speed determination circuit further comprises a global positioning system receiver.

3. The apparatus as recited in claim 1 wherein the speed determination circuit receives a vehicle speed signal from the vehicle.

4. The apparatus as recited in claim 1 wherein the preselected speed is zero.

5. The apparatus as recited in claim 1 wherein the preselected speed is greater than zero.

6. The apparatus as recited in claim 1 further comprising an input device adapted for user input of the preselected speed and a memory device that receives the preselected speed from the input device and provides the preselected speed to the comparator.

7. The apparatus as recited in claim 1 wherein the radar detecting circuit further comprises a local oscillator that generates a local oscillator signal when the comparator provides the on signal and does not generate the local oscillator signal when the comparator provides the off signal.

8. An apparatus for selectively monitoring radar signals impinging on a vehicle comprising:
   a speed determination circuit that determines a vehicle speed and provides a speed signal representative thereof;
   a radar detecting circuit that detects the radar signals and provides a radar detected signal in response to detection of the radar signals when the radar detecting circuit is powered;
   a comparator that receives the speed signal from the speed determination circuit, compares the speed signal to a preselected speed and powers the radar detecting circuit if the vehicle speed exceeds the preselected speed; and
   an alarm responsive to the radar detected signal that provides an alert in response thereto.

9. The apparatus as recited in claim 8 wherein the speed determination circuit further comprises a global positioning system receiver.

10. The apparatus as recited in claim 8 wherein the speed determination circuit receives a vehicle speed signal from the vehicle.

11. The apparatus as recited in claim 8 wherein the preselected speed is zero.

12. The apparatus as recited in claim 8 wherein the preselected speed is greater than zero.

13. The apparatus as recited in claim 8 further comprising an input device adapted for user input of the preselected speed and a memory device that receives the preselected speed from the input device and provides the preselected speed to the comparator.

14. The apparatus as recited in claim 8 wherein the radar detecting circuit further comprises a local oscillator that generates a local oscillator signal if the radar detection circuit is powered.

15. An apparatus for selectively monitoring radar signals impinging on a vehicle comprising:
   a global positioning system receiver that determines a vehicle speed and provides a speed signal representative thereof;

a comparator that receives the speed signal, compares the speed signal to a preselected speed and provides an on signal when the vehicle speed exceeds the preselected speed and an off signal when the vehicle speed is at or below the preselected speed;

a radar detecting circuit including an antenna that receives the radar signals and a local oscillator that generates a local oscillator signal that is mixed with the radar signals to generate a radar detected signal, the local oscillator signal being generated only if the comparator provides the on signal; and an alarm responsive to the radar detected signal that provides an alert in response thereto.

16. The apparatus as recited in claim 15 wherein the preselected speed is zero.

17. The apparatus as recited in claim 15 wherein the preselected speed is greater than zero.

18. The apparatus as recited in claim 15 further comprising an input device adapted for user input of the preselected speed and a memory device that receives the preselected speed from the input device and provides the preselected speed to the comparator.

19. A method for selectively monitoring radar signals impinging on a vehicle comprising the steps of:

determining a vehicle speed;

determining whether the vehicle speed exceeds a preselected speed; and detecting the radar signals only if the vehicle speed exceeds the preselected speed.

20. The method as recited in claim 19 wherein the step of determining a vehicle speed further comprises the step of determining the vehicle speed with a global positioning system receiver.

21. The method as recited in claim 19 wherein the step of determining a vehicle speed further comprises the step of determining the vehicle speed from a vehicle speed signal generated by the vehicle.

22. The method as recited in claim 19 wherein the step of determining whether the vehicle speed exceeds a preselected speed further comprises the step of determining whether the vehicle speed exceeds zero.

23. The method as recited in claim 19 wherein the step of determining whether the vehicle speed exceeds a preselected speed further comprises the step of determining whether the vehicle speed exceeds a speed greater than zero.

24. The method as recited in claim 19 further comprising the step of inputting the preselected speed into a memory device.

25. The method as recited in claim 19 further comprises the step of generating a local oscillator signal only if the vehicle speed exceeds the preselected speed.

26. A method for selectively monitoring radar signals impinging on a vehicle comprising the steps of:

determining a vehicle speed and generating a speed signal representative thereof;

comparing the speed signal with a preselected speed;

generating an on signal if the vehicle speed exceeds the preselected speed and generating an off signal if the vehicle speed is at or below the preselected speed;

receiving the radar signals with an antenna;

generating a local oscillator signal that is mixed with the radar signals to generate a radar detected signal if the on signal is generated; and providing an alert if the radar detected signal is generated.

27. The method as recited in claim 26 wherein the step of determining a vehicle speed further comprises the step of determining the vehicle speed with a global positioning system receiver.

28. The method as recited in claim 26 wherein the step of determining a vehicle speed further comprises the step of determining the vehicle speed from a vehicle speed signal generated by the vehicle.

29. The method as recited in claim 26 wherein the step of comparing the speed signal with a preselected speed further comprises the step of determining whether the vehicle speed exceeds zero.

30. The method as recited in claim 26 wherein the step of comparing the speed signal with a preselected speed further comprises the step of determining whether the vehicle speed exceeds a speed greater than zero.

31. The method as recited in claim 26 further comprising the step of inputting the preselected speed into a memory device.

32. The method as recited in claim 26 further comprises the step of generating a local oscillator signal only if the on signal is generated.

* * * * *